United States Patent
Tan et al.

(10) Patent No.: US 12,511,545 B2
(45) Date of Patent: Dec. 30, 2025

(54) TRAINING ROBUST NEURAL NETWORKS VIA SMOOTH ACTIVATION FUNCTIONS

(71) Applicant: Google LLC, Mountain View, CA (US)

(72) Inventors: Mingxing Tan, Newark, CA (US); Cihang Xie, Baltimore, MD (US); Boqing Gong, Bellevue, WA (US); Quoc V. Le, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1150 days.

(21) Appl. No.: 17/337,812

(22) Filed: Jun. 3, 2021

(65) Prior Publication Data

US 2021/0383237 A1     Dec. 9, 2021

Related U.S. Application Data

(60) Provisional application No. 63/034,173, filed on Jun. 3, 2020.

(51) Int. Cl.
*G06N 3/084* (2023.01)
*G06N 3/048* (2023.01)

(52) U.S. Cl.
CPC ............ *G06N 3/084* (2013.01); *G06N 3/048* (2023.01)

(58) Field of Classification Search
None
See application file for complete search history.

(56) References Cited

U.S. PATENT DOCUMENTS

| 10,783,401 | B1 * | 9/2020 | Jiang | G06N 3/086 |
| 11,645,499 | B2 * | 5/2023 | Guntoro | G06N 3/08 |
| | | | | 706/31 |
| 2018/0137413 | A1 * | 5/2018 | Li | G06N 20/00 |
| 2019/0114541 | A1 * | 4/2019 | Yang | G06N 3/04 |
| 2020/0005143 | A1 * | 1/2020 | Zamora Esquivel | G06N 3/08 |
| 2020/0097818 | A1 * | 3/2020 | Li | G06N 3/08 |

(Continued)

OTHER PUBLICATIONS

Searching for activation function; Ramachandran et al. (Year: 2017).*

(Continued)

*Primary Examiner* — Mandrita Brahmachari
(74) *Attorney, Agent, or Firm* — DORITY & MANNING P.A.

(57) ABSTRACT

Generally, the present disclosure is directed to the training of robust neural network models by using smooth activation functions. Systems and methods according to the present disclosure may generate and/or train neural network models with improved robustness without incurring a substantial accuracy penalty and/or increased computational cost, or without any such penalty at all. For instance, in some examples, the accuracy may improve. A smooth activation function may replace an original activation function in a machine-learned model when backpropagating a loss function through the model. Optionally, one activation function may be used in the model at inference time, and a replacement activation function may be used when backpropagating a loss function through the model. The replacement activation function may be used to update learnable parameters of the model and/or to generate adversarial examples for training the model.

20 Claims, 8 Drawing Sheets

(56) References Cited

U.S. PATENT DOCUMENTS

| | | | |
|---|---|---|---|
| 2020/0285952 A1* | 9/2020 | Liu | G06N 3/08 |
| 2020/0302234 A1* | 9/2020 | Walters | G06F 16/9035 |
| 2020/0364616 A1* | 11/2020 | Wong | G06N 20/00 |
| 2020/0372305 A1* | 11/2020 | Streeter | G06N 3/084 |
| 2021/0097343 A1* | 4/2021 | Goodsitt | G06N 3/088 |
| 2021/0181754 A1* | 6/2021 | Cui | G06N 3/088 |
| 2021/0279591 A1* | 9/2021 | Shamir | G06N 3/04 |

OTHER PUBLICATIONS

Adversarial Machine learning at scale (Year: 2017).*

Aprilpyone et al., "Block-wise Image Transformation with Secret Key for Adversarially Robust Defense", arXiv:2010.00801v1, Oct. 2, 2020, 15 pages.

Athalye et al., "Obfuscated Gradients Give a False Sense of Security: Circumventing Defenses to Adversarial Examples", arXiv:1802.00420v4, Jul. 31, 2018, 12 pages.

Barron, "Continuously Differentiable Exponential Linear Units", arXiv:1704.07483v1, Apr. 24, 2017, 2 pages.

Bhagoji et al., "Enhancing Robustness of Machine Learning Systems via Data Transformations", arXiv:1704.02654v4, Nov. 29, 2017, 15 pages.

Biswas et al., "Tanhsoft—A Family of Activation Functions Combining Tanh and Softplus", arXiv:2009.03863v1, Sep. 8, 2020, 11 pages.

Buckman et al., "Thermometer Encoding: One Hot Way to Resist Adversarial Examples", International Conference on Learning Representations, Apr. 30-May 3, 2018, Vancouver, Canada, 22 pages.

Carlini et al., "On Evaluating Adversarial Robustness", arXiv:1902.06705v2, Feb. 20, 2019, 24 pages.

Chen et al., "Anti-Bandit Neural Architecture Search for Model Defense", arXiv:2008.00698v2, Aug. 5, 2020, 18 pages.

Clevert et al., "Fast and Accurate Deep Network Learning by Exponential Linear Units (ELUs)", arXiv:1511.07289v1, Nov. 23, 2015, 14 pages.

Croce et al., "Reliable Evaluation of Adversarial Robustness with an Ensemble of Diverse Parameter-free Attacks", Jul. 12-18, 2020, Virtual, 11 pages.

Cubuk et al., "AutoAugment: Learning Augmentation Strategies from Data", Conference on Computer Vision and Pattern Recognition, Jun. 16-20, 2019, Long Beach, CA, 11 pages.

Dhillon et al., "Stochastic Activation Pruning for Robust Adversarial Defense", arXiv:1803.01442v1, Mar. 5, 2018, 13 pages.

Ding et al., "MMA Training: Direct Input Space Margin Maximization through Adversarial Training", arXiv:1812.02637v4, Mar. 4, 2020, 28 pages.

Dong et al., "Boosting Adversarial Attacks with Momentum", Conference on Computer Vision and Pattern Recognition, Jun. 18-22, 2018, Salt Lake City, UT, pp. 9185-9193.

Dziugaite et al., "A study of the effect of JPG compression on adversarial images", arXiv:1608.00853v1, Aug. 2, 2016, 8 pages.

Elfwing et al., "Sigmoid-weighted linear units for neural networks function approximation in reinforcement learning", Neural Networks, vol. 107, 2018, pp. 3-11.

Galloway et al., "Batch Normalization is a Cause of Adversarial Vulnerability", arXiv:1905.02161v2, May 29, 2019, 17 pages.

Gao et al., "Convergence of Adversarial Training in Overparametrized Neural Networks", Conference on Neural Information Processing Systems, Dec. 8-14, 2019, Vancouver, Canada, 12 pages.

Goodfellow et al., "Explaining and Harnessing Adversarial Examples", arXiv:1412.6572v3, Mar. 20, 2015, 11 pages.

Guo et al., "Countering Adversarial Images Using Input Transformations" arXiv:1711.00117v3, Jan. 25, 2018, 12 pages.

Guo et al., "When NAS Meets Robustness: In Search of Robust Architectures against Adversarial Attacks", Conference on Computer Vision and Pattern Recognition, Jun. 14-19, 2020, Virtual, pp. 631-640.

Hahnloser et al., "Digital selection and analogue ampli®cation coexist in a cortex-inspired silicon circuit", Nature, vol. 405, Jun. 22, 2000, pp. 947-951.

He et al., "Deep Residual Learning for Image Recognition", Conference on Computer Vision and Pattern Recognition, Jun. 26-Jul. 1, 2016, Las Vegas, NV, pp. 770-778.

Hendrycks et al., "Gaussian Error Linear Units (GELUs)", arXiv:1606.08415, Nov. 11, 2018, 9 pages.

Hoffer et al., "Train longer, generalize better: closing the generalization gap in large batch training of neural networks", Conference on Neural Information Processing Systems, Dec. 4-9, 2017, Long Beach, CA, 11 pages.

Huang et al., "Deep Networks with Stochastic Depth", European Conference on Computer Vision, Oct. 8-16, 2016, Amsterdam, The Netherlands, 16 pages.

Ilyas et al., "Adversarial Examples are not Bugs, they are Features", Conference on Neural Information Processing Systems, Dec. 8-14, 2019, Vancouver, Canada, 12 pages.

Izmailov et al., "Averaging Weights Leads to Wider Optima and Better Generalization", arXiv:1803.05407v2, Aug. 8, 2018, 11 pages.

Kettunen et al., "E-LPIPS: Robust Perceptual Image Similarity via Random Transformation Ensembles", arXiv:1906.03973v2, Jun. 11, 2019, 10 pages.

Kurakin et al., "Adversarial Machine Learning at Scale", International Conference on Learning Representations, Apr. 24-26, 2017, Toulon, France, 17 pages.

Lee et al., "Robust Ensemble Model Training via Random Layer Sampling Against Adversarial Attack", arXiv:2005.10757v1, May 21, 2020, 13 pages.

Li et al., "Visualizing the Loss Landscape of Neural Nets", Conference on Neural Information Processing Systems, Dec. 3-8, 2018, Montreal, Canada, 11 pages.

Liao et al., "Defense against Adversarial Attacks Using High-Level Representation Guided Denoiser", Conference on Computer Vision and Pattern Recognition, Jun. 18-22, 2018, Salt Lake City, UT, pp. 1778-1787.

Liu et al., "Towards Robust Neural Networks via Random Self-ensemble", European Conference on Computer Vision, Sep. 8-14, 2018, Munich, Germany, 17 pages.

Lokhande et al., "Generating Accurate Pseudo-labels in Semi-Supervised Learning and Avoiding Overconfident Predictions via Hermite Polynomial Activations", Conference on Computer Vision and Pattern Recognition, Jun. 14-19, 2020, Virtual, pp. 11435-11443.

Luo et al., "Foveation-based Mechanisms Alleviate Adversarial Examples", arXiv:1511.06292v1, Nov. 19, 2015, 23 pages.

Luo et al., "Random Mask: Towards Robust Convolutional Neural Networks", arXiv:2007.14249v1, Jul. 27, 2020, 26 pages.

Madry et al., "Towards Deep Learning Models Resistant to Adversarial Attacks", International Conference on Learning Representations, Apr. 30-May 3, 2018, Vancouver, Canada, 23 pages.

Meng et al., "MagNet: a Two-Pronged Defense against Adversarial Examples", ACM Conference on Computer and Communications Security, Oct. 30- Nov. 3rd, Dallas, TX, pp. 135-147.

Misra, "Mish: A Self Regularized Non-Monotonic Neural Activation Function", arXiv:1908.08681v2, Oct. 2, 2019, 13 pages.

Nair et al., "Rectified Linear Units Improve Restricted Boltzmann Machines", International Conference on Machine Learning, Jun. 21-24, 2010, Haifa, Israel, 8 pages.

Nakkiran, "Adversarial Robustness May Be at Odds With Simplicity", arXiv:1901.00532v1, Jan. 2, 2019, 8 pages.

Pang et al., "Bag of Tricks for Adversarial Training", International Conference on Learning Representations, May 3-7, 2021, Virtual, 21 pages.

Pang et al., "Improving Adversarial Robustness via Promoting Ensemble Diversity", International Conference on Machine Learning, Jun. 10-15, 2019, Long Beach, California, 10 pages.

Pang et al., "Mixup Inference: Better Exploiting Mixup to Defend Adversarial Attacks", International Conference on Learning Representations, Apr. 26-May 1, 2020 Virtual, 14 pages.

(56) References Cited

OTHER PUBLICATIONS

Papernot et al., "Practical Black-Box Attacks against Machine Learning", Asia Conference on Computer and Communications Security, Apr. 2-6, 2017, Abu Dhabi, United Arab Emirates, pp. 506-519.
Prakash et al., "Deflecting Adversarial Attacks with Pixel Deflection", Conference on Computer Vision and Pattern Recognition, Jun. 18-22, 2018, Salt Lake City, UT, pp. 8571-8580.
Qin et al., "Adversarial Robustness through Local Linearization", Conference on Neural Information Processing Systems, Dec. 8-14, 2019, Vancouver, Canada, 10 pages.
Raff et al., "Barrage of Random Transforms for Adversarially Robust Defense", Conference on Computer Vision and Pattern Recognition, Jun. 16-20, 2019, Long Beach, CA, pp. 6528-6537.
Ramachandran et al., "Searching for Activation Functions", arXiv:1710.05941v2, Oct. 27, 2017, 13 pages.
Rozsa et al., "Improved Adversarial Robustness by Reducing Open Space Risk via Tent Activations", arXiv:1908.02435, Aug. 7, 2019, 15 pages.
Russakovsky et al., "ImageNet Large Scale Visual Recognition Challenge", arXiv:1409.0575v3, Jan. 30, 2015, 43 pages.
Samangouei et al., "Defense-GAN: Protecting Classifiers Against Adversarial Attacks Using Generative Models", International Conference on Learning Representations, Apr. 30-May 3, 2018, Vancouver, Canada, 17 pages.
Schott et al., "Towards the First Adversarially Robust Neural Network Model on MNIST", International Conference on Learning Representations, May 6-9, 2019, New Orleans, Louisiana, 17 pages.
Shafahi et al., "Adversarial Training for Free!", Conference on Neural Information Processing Systems, Dec. 8-14, 2019, Vancouver, Canada, 12 pages.
Shamir et al., "Smooth Activations and Reproducibility in Deep Networks", arXiv:2010.009931v2, Dec. 1, 2020, 23 pages.
Sinha et al., "Certifying Some Distributional Robustness with Principled Adversarial Training", International Conference on Learning Representations, Apr. 30-May 3, 2018, Vancouver, Canada, 34 pages.
Song et al., "PixelDefend: Leveraging Generative Models to Understand and Defend Against Adversarial Examples", International Conference on Learning Representations, Apr. 30-May 3, 2018, Vancouver, Canada, 20 pages.
Srivastava et al., "Dropout: A Simple Way to Prevent Neural Networks from Overfitting", Journal of Machine Learning Research, vol. 15, Jun. 2014, pp. 1929-1958.
Strauss et al., "Ensemble Methods as a Defense to Adversarial Perturbations Against Deep Neural Networks", arXiv:1709.03423v1., Sep. 11, 2017, 11 pages.
Su et al., "Is Robustness the Cost of Accuracy?—A Comprehensive Study on the Robustness of 18 Deep Image Classification Models", European Conference on Computer Vision, Sep. 8-14, 2018, Munich, Germany, 18 pages.
Szegedy et al., "Intriguing properties of neural networks", arXiv:1312.6199v4, Feb. 19, 2014, 10 pages.
Tan et al., "EfficientNet: Rethinking Model Scaling for Convolutional Neural Networks", International Conference on Machine Learning, Jun. 10-15, 2019, Long Beach, CA, 10 pages.
Tsipras et al., "Robustness May Be at Odds with Accuracy", arXiv:1805.12152v5, Sep. 9, 2019, 24 pages.
Wang et al., "Defensive Dropout for Hardening Deep Neural Networks under Adversarial Attacks", International Conference on Computer-Aided Design, Nov. 5-8, 2018, San Diego, CA, 8 pages.
Wang et al., "Improving Adversarial Robustness Requires Revisiting Misclassified Examples", International Conference on Learning Representations, Apr. 26-May 1, 2020, Virtual, 14 pages.
Wang et al., "On the Convergence and Robustness of Adversarial Training", International Conference on Machine Learning, Jun. 10-15, 2019, Long Beach, CA, 10 pages.
Wang et al., "Protecting Neural Networks with Hierarchical Random Switching: Towards Better Robustness-Accuracy Trade-off for Stochastic Defenses", International Joint Conference on Artificial Intelligence, Aug. 10-16, 2019, Macao, China, pp. 6013-6019.
Wong et al., "Fast is Better than Free: Revisiting Adversarial Training", International Conference on Learning Representations, Apr. 26-May 1, 2020, Virtual, 17 pages.
Xiao et al., "Enhancing Adversarial Defense by k-Winners-Take-All", International Conference on Learning Representations, Apr. 26-May 1, 2020, Virtual, 30 pages.
Xiao et al., "One Man's Trash is Another Man's Treasure: Resisting Adversarial Examples by Adversarial Examples", Conference on Computer Vision and Pattern Recognition, Jun. 14-19, 2020, pp. 412-421.
Xie et al., "Aggregated Residual Transformations for Deep Neural Networks", Conference on Computer Vision and Pattern Recognition, Jul. 21-26, 2017, Honolulu, Hawaii, pp. 1492-1500.
Xie et al., "Feature Denoising for Improving Adversarial Robustness", Conference on Computer Vision and Pattern Recognition, Jun. 16-20, 2019, Long Beach, CA, pp. 501-509.
Xie et al., "Intriguing Properties of Adversarial Training at Scale", International Conference on Learning Representations, Apr. 26-May 1, 2020, Virtual, 14 pages.
Xie et al., "Mitigating Adversarial Effects Through Randomization", International Conference on Learning Representations, Apr. 30-May 3, 2018, Vancouver, Canada, 16 pages.
Xie et al., "Self-training with Noisy Student improves ImageNet classification", Conference on Computer Vision and Pattern Recognition, Jun. 14-19, 2020, Virtual, pp. 10687-10698.
Xie et al., "Smooth Adversarial Training", arXiv:2006.14536v2, Jul. 11, 2021, 11 pages.
Xu et al., "Feature Squeezing: Detecting Adversarial Examples in Deep Neural Networks", Network and Distributed Systems Security Symposium, Feb. 18-21, 2018, San Diego, CA, 15 pages.
Zhang et al., "Theoretically Principled Trade-off between Robustness and Accuracy", International Conference on Machine Learning, Jun. 10-Jun. 15, 2019, Long Beach, California, 11 pages.
Zoph et al., "Neural Architecture Search with Reinforcement Learning", arXiv:1611.01578v1, Nov. 5, 2016, 15 pages.

* cited by examiner

TRAINING ROBUST NEURAL NETWORKS VIA SMOOTH ACTIVATION FUNCTIONS

CROSS-REFERENCE TO RELATED APPLICATIONS

This application claims priority to and the benefit of U.S. Provisional Patent Application No. 63/034,173 filed on Jun. 3, 2020, which is hereby incorporated by reference in its entirety.

FIELD

The present disclosure relates generally to training robust neural networks. More particularly, the present disclosure relates to using smooth activation functions to improve the robustness of a neural network, such as robustness against adversarial techniques.

BACKGROUND

Robust neural network models are designed to maintain accuracy and model functionality in the presence of input noise. Robustness is an important characteristic for models which interface with unstructured real-world data, for example, which can be noisy and contain many outliers that may not fall neatly within the decision boundaries of the model. However, robustness may be especially important when the "noise" is not merely an artifact of messy data. For example, so-called adversarial examples contain "input noise" intentionally crafted to manipulate the inferences of the neural network models.

Adversarial machine learning lies at the intersection of machine learning and computer security. In particular, malicious actors can perform a number of adversarial techniques that are aimed at fooling machine-learned models by maliciously crafting samples that are not perceived as being different by humans, but in fact reliably fool the model into providing an incorrect output. As one example, an adversarial input may appear to a human observer as a verbal request for navigational instructions but, due to its maliciously crafted nature, will fool a machine-learned model into inferring that the user has requested a transfer of money to a certain account and/or has requested a passcode or passphrase for a system security check.

Thus, some adversarial techniques can use inputs to machine-learned models that an attacker has intentionally designed to cause the model to make a mistake. As such, training machine-learned models to be robust against (i.e., to not be fooled by) adversarial techniques is important for improving model, device, network, and user security and privacy. As machine-learned models become more pervasive across all products and computerized decision making, the ability of machine-learned models to withstand adversarial attacks will become of vital importance.

One aspect of adversarial training includes generating adversarial training examples and then training the machine-learned model using the generated adversarial training examples as additional training examples. In particular, in one example, an adversarial example can be created that the computer misrecognizes (or otherwise finds challenging) but that a human clearly recognizes correctly. This adversarial example can be used as a "positive" training example for the class that the human assigns to it. In such fashion, machine-learned models can be trained to be more robust against adversarial inputs.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for improved adversarial training to increase model robustness. In one example, the method includes obtaining, by a computing system comprising one or more computing devices, a training example for a machine-learned model. The example method further includes processing, by the computing system, the training example with the machine-learned model to generate a training output. At least for said processing, one or more activation functions of the machine-learned model may comprise an activation function having a zero-value output for a plurality of negative inputs. The example method may further include evaluating, by the computing system, the training output with a loss function. The example method may further include backpropagating, by the computing system, the loss function through the machine-learned model. At least for said backpropagating, the one or more activation functions are replaced with one or more replacement activation functions, and the one or more replacement activation functions are smooth with continuous gradient.

In another example aspect of the present disclosure, embodiments are directed to an example computer-implemented method which includes receiving, by a computing system comprising one or more computing devices, a training request corresponding to a machine-learned model. The machine-learned model may comprise an original activation function. The training request may identify robustness as a primary objective. Responsive to receiving the training request, the example method further includes determining, by the computing system, a replacement activation function for training of the machine-learned model. The replacement activation function may be smooth. The example method may further include training, by the computing system, the machine-learned model using the replacement activation function.

In other example aspects, embodiments are directed to a computing system. In one example, the computing system comprises one or more processors and one or more non-transitory computer-readable media that collectively store instructions. When executed by the one or more processors, the instructions may cause the computing system to perform operations. In one example, the operations comprise obtaining a training example for a machine-learned model, wherein the machine-learned model comprises one or more original activation functions. The example operations further comprise processing the training example with the machine-learned model to generate a training output. The example operations further comprise evaluating the training output with a loss function. The example operations further comprise generating an adversarial example from the training example by backpropagating the loss function through the machine-learned model. At least for said backpropagating, the one or more original activation functions are replaced with one or more replacement activation functions, and the one or more replacement activation functions are smooth with continuous gradient. The example operations further include training the machine-learned model using the adversarial example.

In other example aspects, embodiments are directed to a computing system comprising one or more processors and one or more non-transitory computer-readable media that collectively store a neural network model. The neural network model may comprise an activation layer which receives a layer input and generates a layer output. The layer output is smooth with continuous gradient, and the layer output is zero-valued when the layer input is negative. The media may further collectively store instructions that, when executed by the one or more processors, cause the computing system to perform operations which comprise inputting an activation layer input as the layer input to the activation layer. The operations may further comprise generating an activation layer output. The activation layer output may be the layer output of the activation layer. In some examples, the activation layer is a smooth approximation of a rectified linear unit (ReLU) activation layer. In some examples, the activation layer contains a learnable parameter.

BRIEF DESCRIPTION OF THE DRAWINGS

Detailed discussion of embodiments directed to one of ordinary skill in the art is set forth in the specification, which makes reference to the appended figures, in which.

Figure 1:
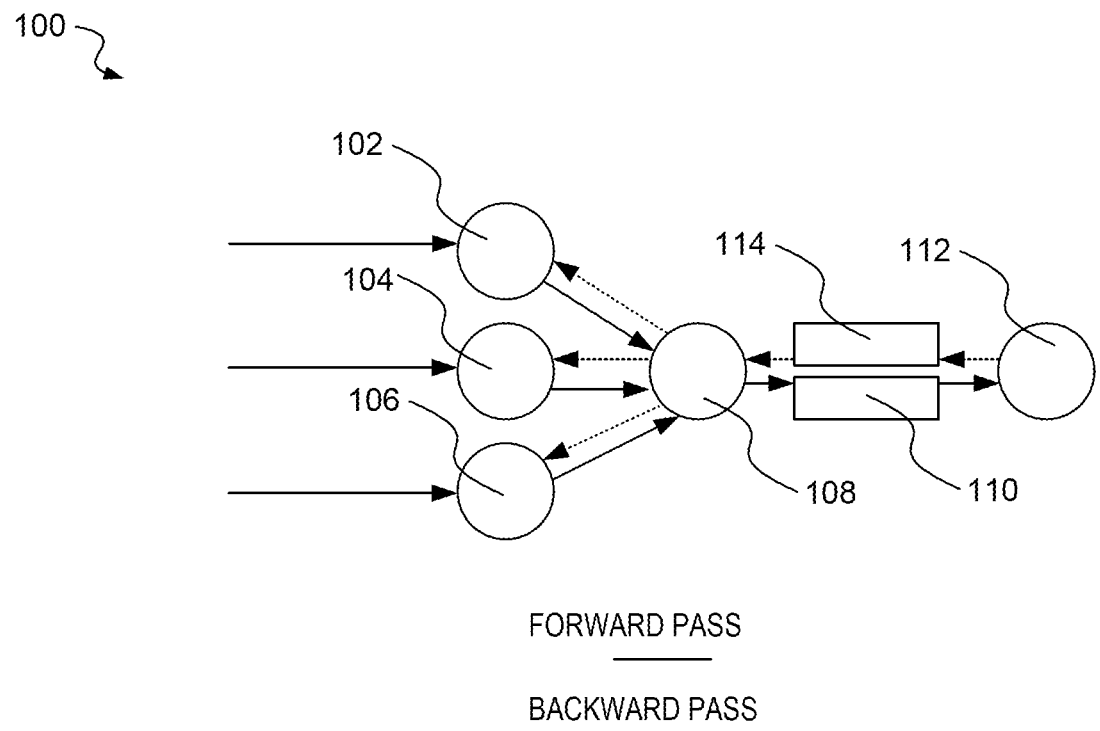
FIG. 1 depicts a system diagram for an example system for training a neural network model according to example embodiments of the present disclosure.

Reference numerals that are repeated across plural figures are intended to identify the same features in various implementations.

DETAILED DESCRIPTION

Overview

Generally, the present disclosure is directed to the training of robust neural network models by using smooth activation functions. Systems and methods according to the present disclosure may generate and/or train neural network models with improved robustness without incurring a substantial accuracy penalty and/or increased computational cost, or without any such penalty at all. For instance, in some examples, the accuracy may improve.

In a simple example, a neural network model may operate to draw a decision boundary to designate different classifications for inputs to the model. In general, it is desirable that similar inputs be assigned similar classifications (e.g., be mapped to the same side of the decision boundary). In one sense, robustness may be thought of as the ability of a neural network model to disregard insignificant differences in inputs (e.g., noise, etc.) and correctly group similar inputs together. One challenge lies in training the neural network model to recognize substantive differences (e.g., to maintain accuracy) and ignore insignificant differences (e.g., to achieve robustness).

In the context of adversarial examples, inputs may be generated which exploit a particular model's inability to distinguish certain substantive and insignificant differences between inputs. For example, a model may be analyzed to determine how to make small changes to the input in order to achieve large changes in the output. In some cases, the analysis may include examining the gradient of the model (e.g., the rates at which a change in an input, changes an output) to exploit instabilities. Prior approaches to defend against these attacks include masking the gradient (e.g., by using discretized or other non-differentiable models or model components). However, while these approaches may make adversarial examples harder to find, the approaches do not necessarily improve the model's robustness against the adversarial examples that still exist. Adversarial examples may still be found, for example, by simulating or emulating the model using a differentiable proxy model.

Other prior approaches have involved training a model using adversarial examples in the training data. In this manner, the model may learn to recognize and adapt to small differences in the inputs. However, computing adversarial examples can be computationally expensive—in some prior examples, a new adversarial example must be iteratively generated each time the model parameters are updated, dramatically increasing the computational cost over non-adversarial training. Further, certain techniques which generate adversarial examples rely on backpropagating the gradient of the loss function back to the input to identify a more challenging, adversarial input. However, when the model contains certain "non-smooth" activation functions or other operations/parameters which have a discontinuous gradient (e.g., a ReLU activation function), the backpropagated gradient does not result in an ideal adversarial example.

Advantageously, systems and methods of the present disclosure resolve several of the above-noted challenges in training neural network models for improved robustness. Systems and methods according to the present disclosure may achieve increased robustness while maintaining a desired accuracy and computational cost by training a neural network model using "smooth" activation functions that have a continuous gradient. The smooth activation function may replace a non-smooth activation function in the neural network model. The replacement activation function may be used permanently or may be used for a limited purpose, such as only using the replacement activation function during the training of the neural network model and/or during generation of an adversarial training example. In some examples, the parameters of a neural network model are learned using the replacement activation function and/or when generating an adversarial example, but the original activation function is used at inference time. In this manner, the robustness benefits of using a smooth activation function to train the neural network model may be retained without adding any computational cost at inference time.

One example use of the proposed techniques may be provided in the context of a web- or cloud-based or other optimization-as-a-service platform. As one example, a computing system that is providing an optimization services can receive a training request corresponding to a machine-learned model comprising an original activation function, wherein the training request identifies robustness as a primary objective. Responsive to receiving the training request, the optimization system can determine a replacement activation function for training of the machine-learned model. Specifically, for example, the replacement activation function can be smooth and, for example, can replace a non-smooth activation function. The platform or service can train the machine-learned model using the replacement activation function.

In some embodiments, one or more activation functions in at least one neuron, layer, or other portion of a neural network model may be replaced with a replacement activation function that is smooth (i.e., has a continuous gradient). For example, FIG. 1 depicts a system diagram of a system 100 according to the present disclosure for training a neural network model. Although only an extremely simple neural network model is depicted for clarity and ease of explication, it is to be understood that the systems and methods disclosed herein may be broadly applicable to other, more complex neural network models.

During a forward pass (e.g., at inference time and/or for the forward pass during training), weighting operations 102, 104, and 106 can each apply a weight to their respective inputs and pass the resulting value to a summation operation 108. The summation operation 108 combines the outputs of the weighting operations 102, 104, and 106 (and, e.g., optionally a bias) and feeds the combined value as an activation input to an activation function 110. The activation function 110 outputs an activation output 112. In some implementations, during the forward pass, a non-smooth activation function 110 can be used. One example non-smooth activation function is the rectified linear unit (ReLU). Alternatively, during the forward pass, a smooth activation function 110 can be used. Example smooth activation functions are described below with reference to FIGS. 2 and 3.

During a backward pass (e.g., backpropagation for learning one or more of weights 102, 104, and 106 and/or for generating an adversarial training example), a loss may be calculated with respect to the output 112. The loss may be backpropagated through a replacement activation function 114 (e.g., by calculating the gradient through the replacement activation function 114) instead of the original activation function 110. The backpropagation may then continue through the replacement activation function 114 to the summation operation 108 to update the parameters, e.g., the weights 102, 104, and 106. In this manner, one activation function 110 may be used for a forward pass, and a replacement activation function 114 may be used for a backward pass.

The replacement activation function 114 may be the same or different than the original activation function 110. For instance, the original activation function 110 may be a non-smooth activation function, and the replacement activation function 114 may be a smooth activation function. In some examples, the original activation function 110 is a non-smooth activation function. For example, a widely-used activation function for neural network model layers is non-smooth (i.e., has a discontinuous gradient): the Rectified Linear Unit (ReLU) function, shown in Equation (1).

$$ReLU(x) = \begin{cases} x & \text{if } x \geq 0 \\ 0 & \text{otherwise} \end{cases} \quad (1)$$

In some embodiments, the original activation function 110 may be a first smooth activation function and the replacement activation function 114 may be a second smooth activation function, and the first smooth activation function may be the same or different as the second smooth activation function. One suitable smooth activation function includes a smooth activation function having a zero-valued activation output for negative activation inputs. For example, one example of a smooth approximation of ReLU, defined herein as SmoothReLU, may be expressed as in Equation (2), parametrized in α such that $$\lim_{\alpha \to \infty} (f(x, \alpha)) = ReLU(x).$$

$$SmoothReLU(x, \alpha) = \begin{cases} x - \dfrac{\ln(\alpha x + 1)}{\alpha} & \text{if } x \geq 0 \\ 0 & \text{otherwise} \end{cases} \quad (2)$$

Figure 2:
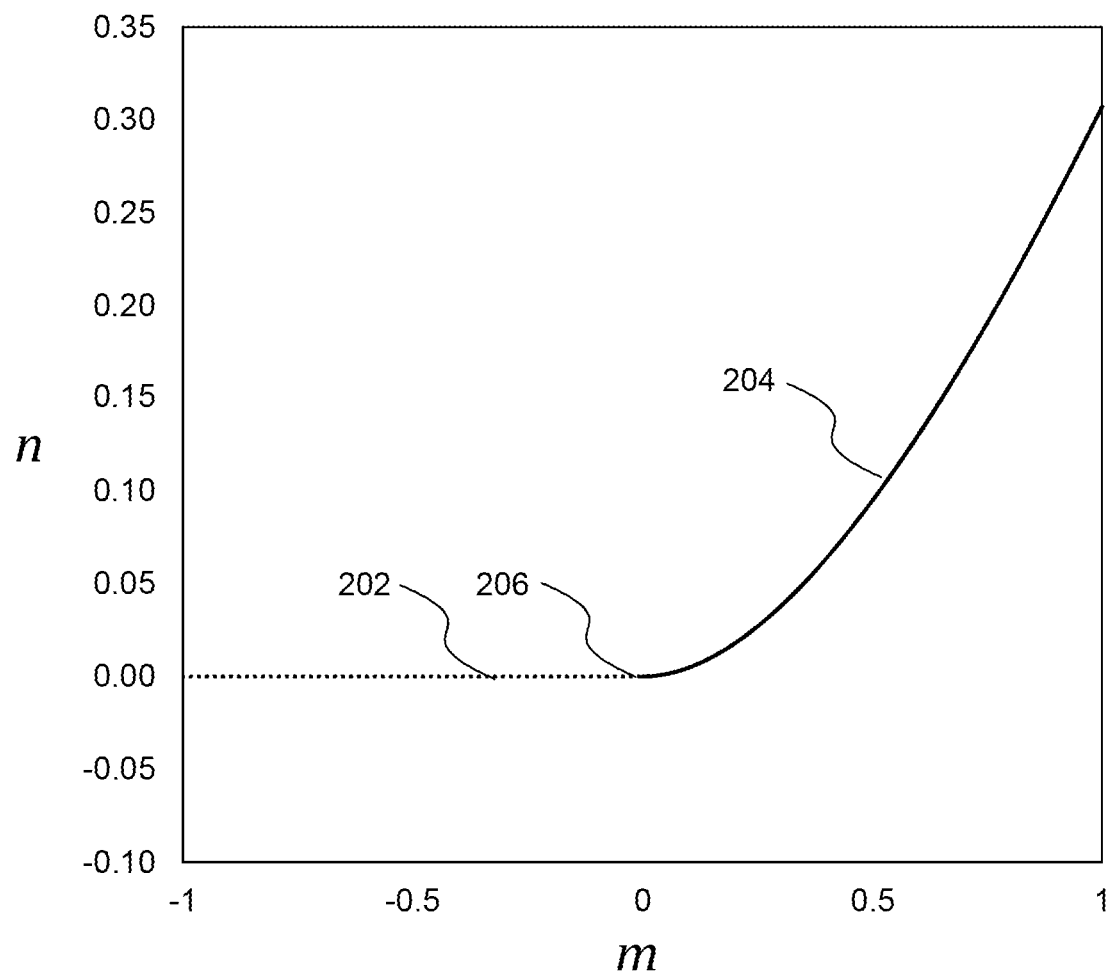
FIG. 2 depicts a plotted curve of an example smooth activation function according to example embodiments of the present disclosure.
Figure 3:
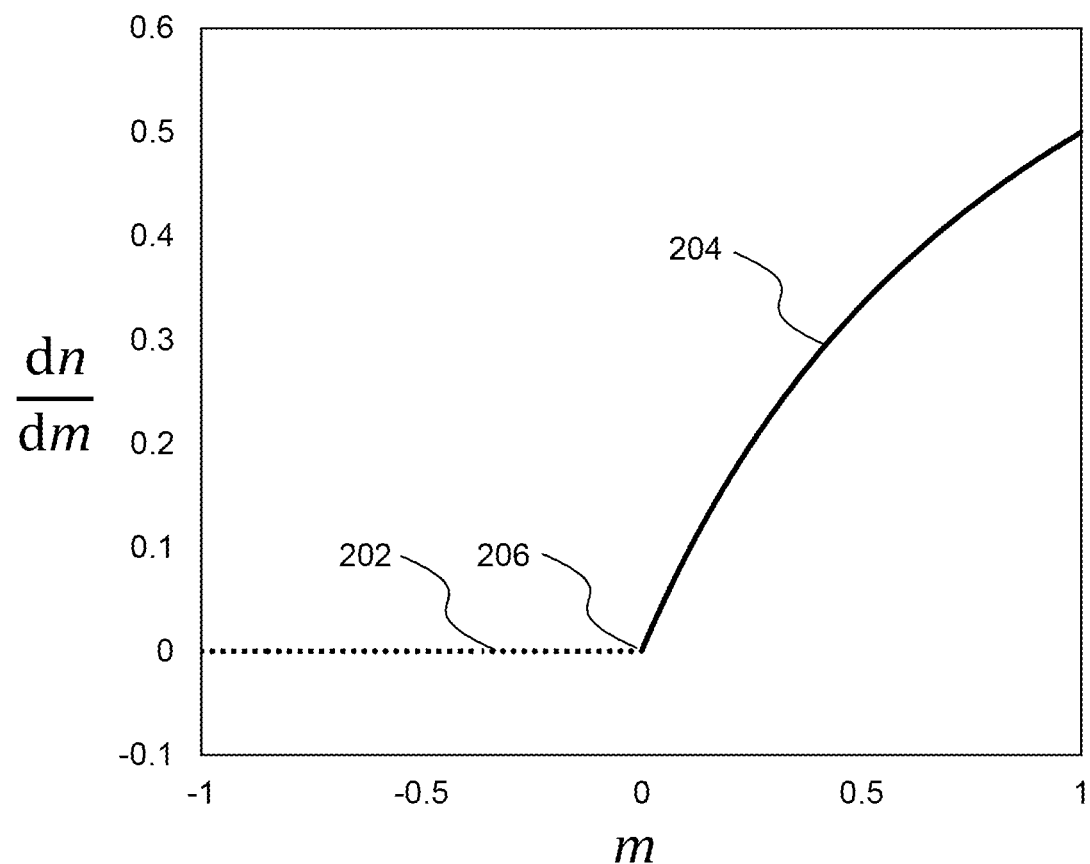
FIG. 3 depicts a plotted curve of a gradient of an example smooth activation function according to example embodiments of the present disclosure.

In one example implementation, SmoothReLU(x, α) may be plotted for all α as shown in FIG. 2, where $n = \alpha \cdot \text{SmoothReLU}(x, \alpha),$ and $m = \alpha x.$ For all negative inputs 202, SmoothReLU(x, α) outputs a zero value and smoothly transitions to outputting positive values for positive inputs 204 at the inflection point 206. In this manner, the gradient of the activation function (e.g., partial derivative with respect to m) is continuous for all finite-valued a, as shown in FIG. 3 (using the same notation in m and n as above and assuming a is a constant) and calculated below, in Equation (3).

$$\dfrac{\partial}{\partial x}[SmoothReLU(x, \alpha)] = \begin{cases} \dfrac{\alpha x}{1 + \alpha x} & \text{if } x \geq 0 \\ 0 & \text{otherwise} \end{cases} \quad (3)$$

Other smooth-valued functions may also be used for the original activation function 110, the replacement activation function 114, or both. As some examples, smooth activation functions may include parametrized softplus, $$f(x, \alpha) = \dfrac{1}{\alpha}\ln(1 + e^{\alpha x});$$

swish, f(x)=x·sigmoid(x); Gaussian Error Linear Unit (GELU); Exponential Linear Unit (ELU); and the like.

In some examples, a smooth activation function may be parametric (e.g., as shown above) and include a learnable parameter. For example, the parametric representation of SmoothRelU in α may be used, and a may be a learnable parameter during a training procedure. For instance, a machine-learning model could be trained to identify a value of α which increases robustness and/or accuracy. Alternatively, the parameter(s) of the smooth activation function may be manually chosen and fixed.

In one example, an original smooth activation function may be used for forward passes (e.g., at inference time), while a replacement smooth activation function may be used for training. In this manner, the advantages of different smooth activation functions may each be realized. For instance, one smooth activation function may be efficiently processed using sparse matrix operations (e.g., an activation function having zero-valued activation outputs) and another smooth valued function may offer improved robustness when used for training. Thus, in one embodiment, an original activation function comprises a smooth activation function with zero-valued activation outputs for negative-valued activation inputs (e.g., SmoothReLU), and this activation is used at inference time. A replacement activation function may comprise another smooth activation function (e.g., parametric softplus, softplus, swish, GELU, ELU), and this activation function may be used for training (e.g., to update model parameter(s) and/or generate adversarial training example(s)).

Additionally, or alternatively, a smooth activation function may be used to generate adversarial training examples. For example, one method of generating adversarial examples includes determining a direction of a gradient of a loss (e.g., calculated with a loss function backpropagated through the model) evaluated at an input, and modifying (e.g., perturbing) the input in a direction that increases the loss function at the training input. In some examples, the goal is to discover the modification (e.g., perturbation) which produces the greatest loss. In some examples, the modified/perturbed input can be used as a training example (e.g., an adversarial training example) so that the neural network model can learn parameters which are robust against such perturbations.

The gradient may be calculated as discussed above with respect to FIG. 1: in some examples, one or more activation functions in the model are replaced with one or more replacement activation functions when backpropagating the loss function through the model. For example, the model may contain one or more original activation functions (e.g., smooth or non-smooth activation functions; ReLU). When backpropagating the loss function through the model, the one or more original activation functions may be replaced with one or more replacement activation functions for calculating the gradient. In some examples, the model processes in the forward direction (e.g., at inference time) using the original activation functions and backpropagates (e.g., for training) using the replacement activation functions.

In some implementations, the adversarial training system can generate the adversarial example by determining a direction of a gradient of a loss function that evaluates an output provided by the machine-learned model when given at least a portion of the training example as an input. The adversarial training system can perturb the training example in a second direction that is based on (e.g., opposite to) the direction of the gradient of the loss function to generate the adversarial example. As one example, the adversarial training system can treat the input data (or a perturbation thereof) as optimizable parameters and backpropagate the loss function all the way through the model and further through the input data to modify the input data (e.g., in the second direction). In some implementations, the model parameters can be fixed during such backpropagation. Other techniques for generating adversarial examples can be used as well in addition or alternatively to the opposite gradient direction technique described above.

In some examples, activation functions as described herein may be implemented in an activation layer. For instance, a neural network model may comprise an activation layer. The activation layer may correspond to activation layer inputs and activation layer outputs according to example embodiments the present disclosure as described above. For instance, an activation layer may provide activation layer inputs and activation layer outputs which correspond to the activation inputs and activation outputs as described herein. In some examples, an activation layer may be implemented in hardware, application specific circuits, firmware and/or software controlling a general purpose processor.

Embodiments of the present invention convey a number of technical advantages and benefits. As one example, smooth activation functions having a zero-valued activation output for negative activation inputs may be processed using sparse matrix operations, which conserves computational resources (e.g., processing energy costs, storage energy costs) by leveraging the efficiency and speed of sparse matrix operations. Additionally, embodiments may train a neural network model using one activation function (e.g., a smooth activation function) while permitting the neural network model to retain another activation function (e.g., ReLU) for use at inference time. In this manner, the neural network model may retain the favorable efficiencies of one activation function (e.g., processing energy costs, storage energy costs) for use at inference time (e.g., on an end-user device, such as a resource-constrained device) while obtaining the robustness advantages from training with another activation function (e.g., a smooth activation function, including those described herein). As a result, the robustness of a neural network model may be improved with little to no energy cost, which may, for example, strengthen the security of neural network models with no energy cost (e.g., for resource-constrained implementations). As another result, the systems and methods of the present disclosure are able to generate (e.g., create and/or modify) better models than existing approaches and achieve a new state-of-the-art trade-off between performance and energy cost/size.

As another example technical effect and benefit, the systems and methods of the present disclosure can increase the robustness of machine-learned models against adversarial attacks by generating better adversarial examples. In particular, certain techniques which generate adversarial examples rely on backpropagating the gradient of the loss function back to the input to identify a more challenging, adversarial input. However, when the model contains certain non-smooth activation functions or other operations/parameters which have a discontinuous gradient (e.g., a ReLU activation function), the backpropagated gradient does not result in an ideal adversarial example. Through the use of smooth activation functions, more complete gradient information is able to be propagated backwards, resulting in more optimal adversarial examples, which enable a more robust model to be trained.

As another example technical effect and benefit, the systems and methods of the present disclosure can increase the robustness of machine-learned models against adversarial attacks without adding additional parameters to an instance of the model. More particularly, one possible, alternative technique for reducing model vulnerability to adversarial attacks is to add a noise layer to the model, where the nodes of the noise layer supply random noise to downstream nodes at inference/training. However, this possible technique increases the number of parameters included in the deployed-instance of the model. This increased number of parameters can require additional memory space to be allocated to store the model, can require additional processing resources be allocated to run the model, and/or can increase the latency associated with running the model (i.e., slower inference speed). In instances in which the model is implemented in a resource-constrained environment such as a mobile device, embedded device, internet of things device, edge device, battery-operated device, etc., even a small increase in the number of parameters can have deleterious effects. In contrast to the introduction of an additional noise layer, the systems and method of the present disclosure can increase robustness of the model against attacks without adding additional parameters to the model.

With reference now to the Figures, example embodiments of the present disclosure will be discussed in further detail.

Example Devices and Systems

Figure 4:
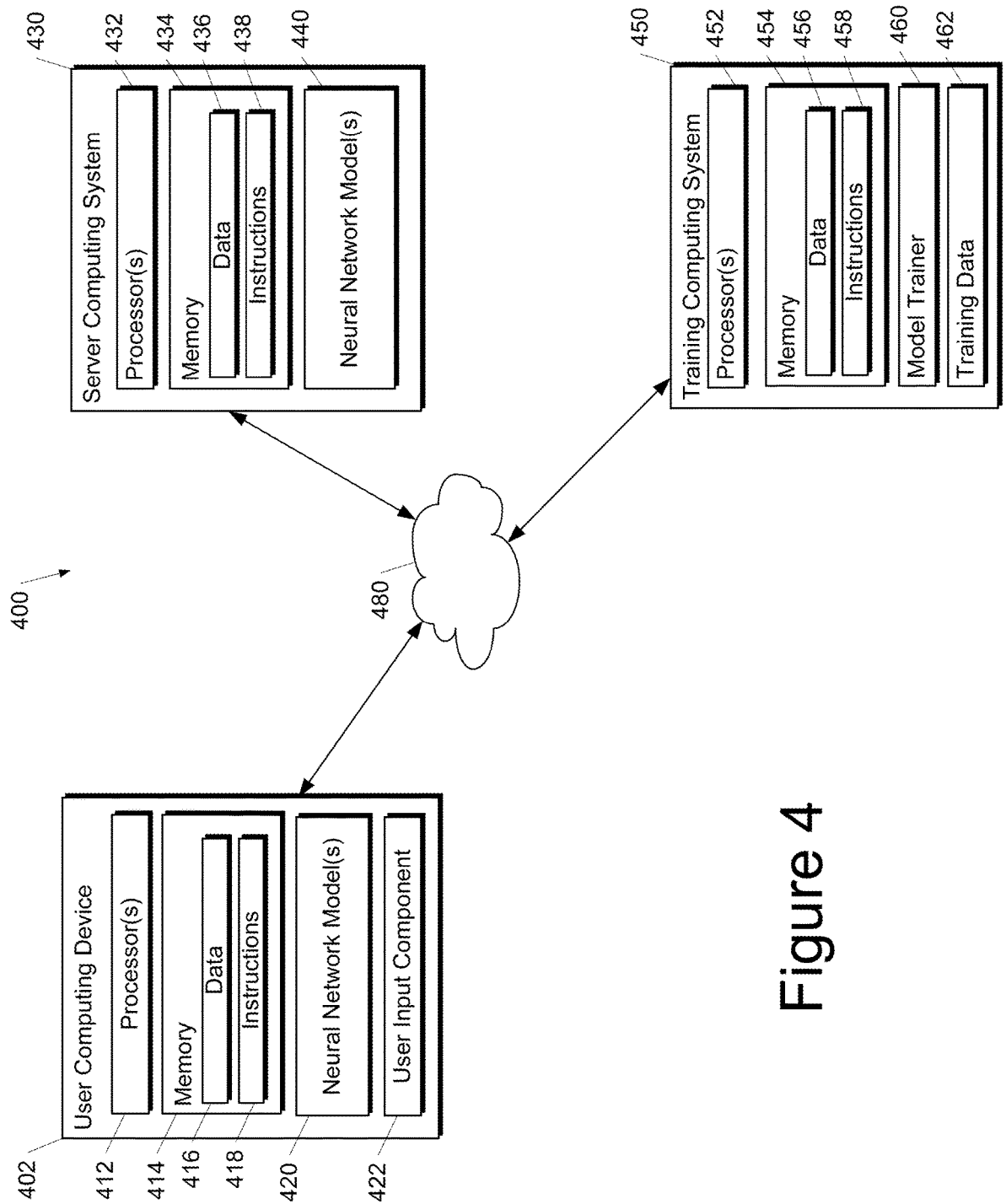
FIG. 4 depicts a block diagram of an example computing system that trains neural network models according to example embodiments of the present disclosure.

FIG. 4 depicts a block diagram of an example computing system 400 that trains neural network models according to example embodiments of the present disclosure. The system 400 includes a user computing device 402, a server computing system 430, and a training computing system 450 that are communicatively coupled over a network 480.

The user computing device 402 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 402 includes one or more processors 412 and a memory 414. The one or more processors 412 can be any suitable processing device (e.g., a processor core, a microprocessor, an ASIC, a FPGA, a controller, a microcontroller, etc.) and can be one processor or a plurality of processors that are operatively connected. The memory 414 can include one or more non-transitory computer-readable storage mediums, such as RAM, ROM, EEPROM, EPROM, flash memory devices, magnetic disks, etc., and combinations thereof. The memory 414 can store data 416 and instructions 418 which are executed by the processor 412 to cause the user computing device 402 to perform operations.

In some implementations, the user computing device 402 can store or include one or more machine-learned models 420. For example, the machine-learned models 420 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 420 can be received from the server computing system 430 over network 480, stored in the user computing device memory 414, and then used or otherwise implemented by the one or more processors 412. In some implementations, the user computing device 402 can implement multiple parallel instances of a single machine-learned model 420 (e.g., to perform parallel training operations across multiple instances).

Additionally or alternatively, one or more machine-learned models 440 can be included in or otherwise stored and implemented by the server computing system 430 that communicates with the user computing device 402 according to a client-server relationship. For example, the machine-learned models 440 can be implemented by the server computing system 440 as a portion of a web service (e.g., a model training service, such as a service for improving the robustness of machine-learned models). Thus, one or more models 420 can be stored and implemented at the user computing device 402 and/or one or more models 440 can be stored and implemented at the server computing system 430.

The user computing device 402 can also include one or more user input component 422 that receives user input. For example, the user input component 422 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input (e.g., camera).

The server computing system 430 includes one or more processors 432 and a memory 434. The one or more processors 432 can be any suitable processing device (e.g., a processor core, a microprocessor, an ASIC, a FPGA, a controller, a microcontroller, etc.) and can be one processor or a plurality of processors that are operatively connected. The memory 434 can include one or more non-transitory computer-readable storage mediums, such as RAM, ROM, EEPROM, EPROM, flash memory devices, magnetic disks, etc., and combinations thereof. The memory 434 can store data 436 and instructions 438 which are executed by the processor 432 to cause the server computing system 430 to perform operations.

In some implementations, the server computing system 430 includes or is otherwise implemented by one or more server computing devices. In instances in which the server computing system 430 includes plural server computing devices, such server computing devices can operate according to sequential computing architectures, parallel computing architectures, or some combination thereof.

As described above, the server computing system 430 can store or otherwise include one or more machine-learned models 440. Example machine-learned models include neural networks or other multi-layer non-linear models. Example neural networks include feed forward neural networks, deep neural networks, recurrent neural networks, and convolutional neural networks.

The user computing device 402 and/or the server computing system 430 can train the models 420 and/or 440 via interaction with the training computing system 450 that is communicatively coupled over the network 480. The training computing system 450 can be separate from the server computing system 430 or can be a portion of the server computing system 430.

The training computing system 450 includes one or more processors 452 and a memory 454. The one or more processors 452 can be any suitable processing device (e.g., a processor core, a microprocessor, an ASIC, a FPGA, a controller, a microcontroller, etc.) and can be one processor or a plurality of processors that are operatively connected. The memory 454 can include one or more non-transitory computer-readable storage mediums, such as RAM, ROM, EEPROM, EPROM, flash memory devices, magnetic disks, etc., and combinations thereof. The memory 454 can store data 456 and instructions 458 which are executed by the processor 452 to cause the training computing system 450 to perform operations. In some implementations, the training computing system 450 includes or is otherwise implemented by one or more server computing devices.

The training computing system 450 can include a model trainer 460 that trains the machine-learned models 420 and/or 440 stored at the user computing device 402 and/or the server computing system 430 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 460 can perform a number of generalization techniques (e.g., weight decays, dropouts, etc.) to improve the generalization capability of the models being trained.

In particular, the model trainer 460 can train the machine-learned models 420 and/or 440 based on a set of training data 462. The training data 462 can include, for example, adversarial examples for adversarial training of the machine-learned models 420 and/or 440. The adversarial examples may, additionally or alternatively, be generated by the model trainer 460 according to embodiments of the present disclosure.

In some implementations, if the user has provided consent, the training examples can be provided by the user computing device 402. Thus, in such implementations, the model 420 provided to the user computing device 402 can be trained by the training computing system 450 on user-specific data received from the user computing device 402 (e.g., text, images, audio, etc.). In some instances, this process can be referred to as personalizing the model.

The model trainer 460 includes computer logic utilized to provide desired functionality. The model trainer 460 can be implemented in hardware, firmware, and/or software controlling a general purpose processor. For example, in some implementations, the model trainer 460 includes program files stored on a storage device, loaded into a memory and executed by one or more processors. In other implementations, the model trainer 460 includes one or more sets of computer-executable instructions that are stored in a tangible computer-readable storage medium such as RAM hard disk or optical or magnetic media.

In some implementations, an input (e.g., an input, data, and/or training example) to the machine-learned model(s) of the present disclosure (e.g., a contained in any one of a user computing device 402, a server computing system 430, and/or a training computing system 450) can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, an input (e.g., an input, data, and/or training example) to the machine-learned model(s) of the present disclosure (e.g., a contained in any one of a user computing device 402, a server computing system 430, and/or a training computing system 450) can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, an input (e.g., an input, data, and/or training example) to the machine-learned model(s) of the present disclosure (e.g., a contained in any one of a user computing device 402, a server computing system 430, and/or a training computing system 450) can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, an input (e.g., an input, data, and/or training example) to the machine-learned model(s) of the present disclosure (e.g., a contained in any one of a user computing device 402, a server computing system 430, and/or a training computing system 450) can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, an input (e.g., an input, data, and/or training example) to the machine-learned model(s) of the present disclosure (e.g., a contained in any one of a user computing device 402, a server computing system 430, and/or a training computing system 450) can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, an input (e.g., an input, data, and/or training example) to the machine-learned model(s) of the present disclosure (e.g., a contained in any one of a user computing device 402, a server computing system 430, and/or a training computing system 450) can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

The network 480 can be any type of communications network, such as a local area network (e.g., intranet), wide area network (e.g., Internet), or some combination thereof and can include any number of wired or wireless links. In general, communication over the network 480 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4 illustrates one example computing system that can be used to implement the present disclosure. Other computing systems can be used as well. For example, in some implementations, the user computing device 402 can include the model trainer 460 and the training dataset 462. In such implementations, the models 420 can be both trained and used locally at the user computing device 402. In some of such implementations, the user computing device 402 can implement the model trainer 460 to personalize the models 420 based on user-specific data.

Figure 5:
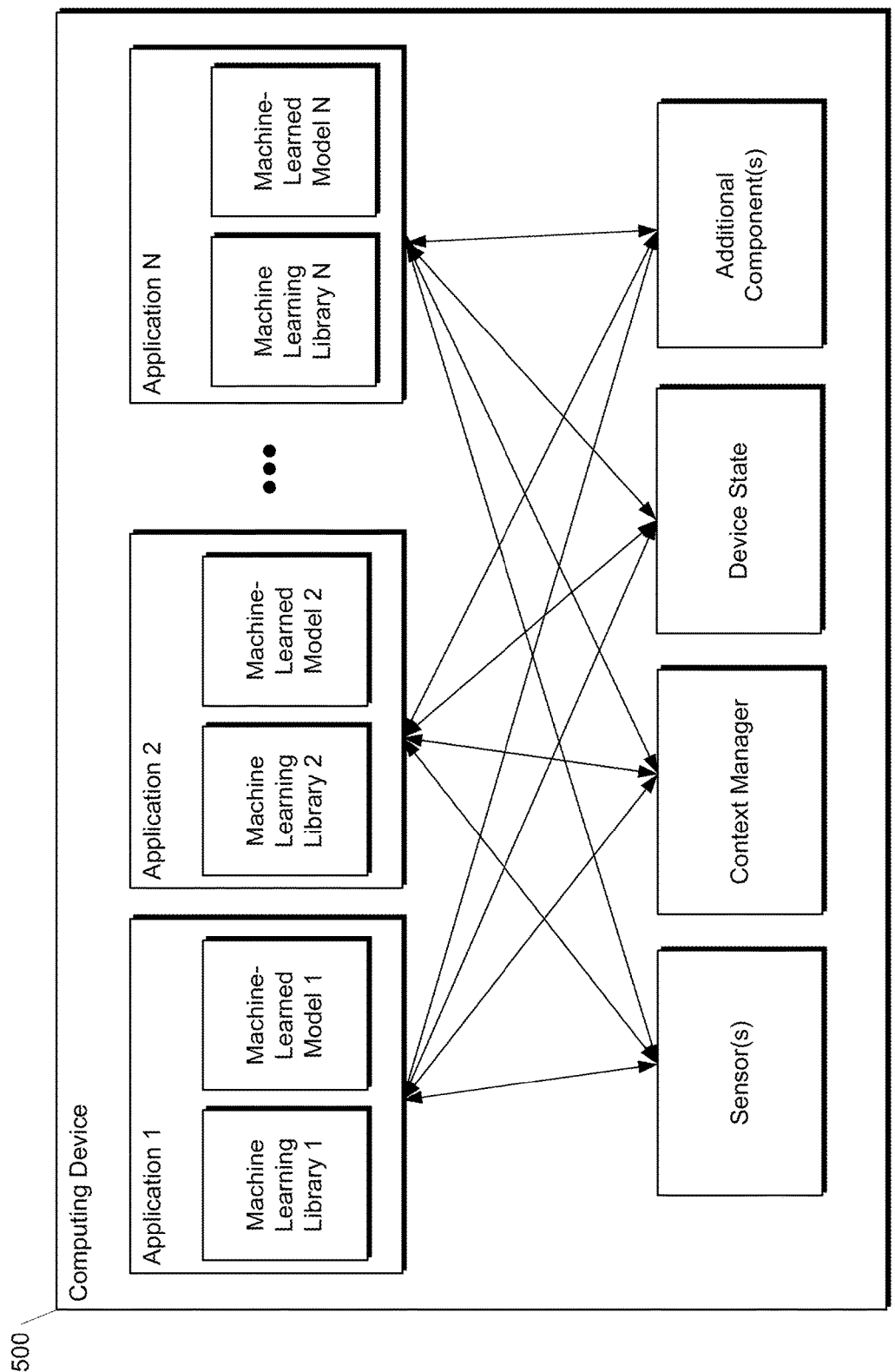
FIG. 5 depicts a block diagram of an example computing device that trains neural network models according to example embodiments of the present disclosure.

FIG. 5 depicts a block diagram of an example computing device 500 that performs according to example embodiments of the present disclosure. The computing device 500 can be a user computing device or a server computing device.

The computing device 500 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6:
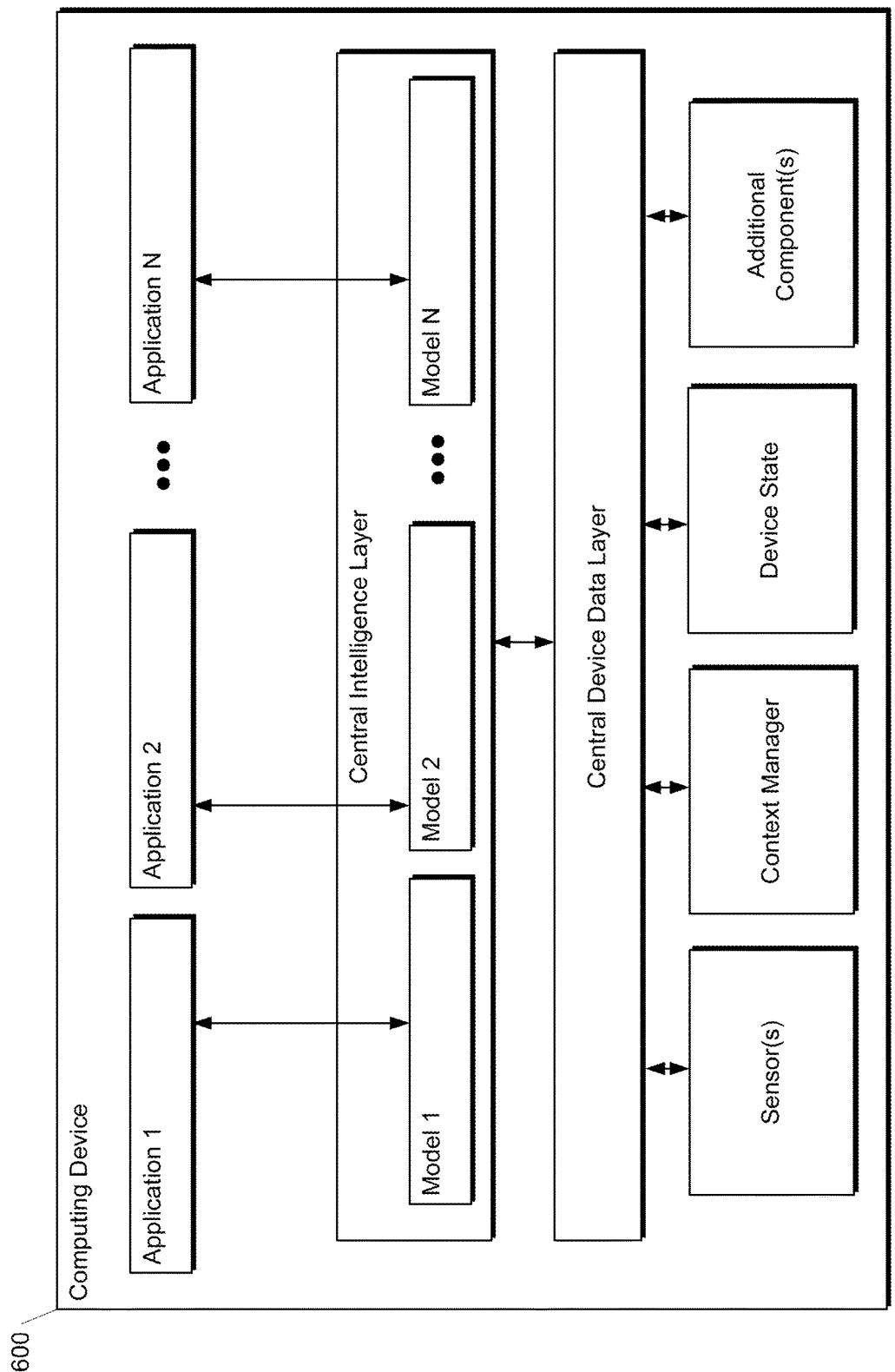
FIG. 6 depicts a block diagram of an example computing device that trains neural network models according to example embodiments of the present disclosure.

FIG. 6 depicts a block diagram of an example computing device 600 that performs according to example embodiments of the present disclosure. The computing device 600 can be a user computing device or a server computing device.

The computing device 600 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 600.

The central intelligence layer can communicate with a central device data layer. The central device data layer can be a centralized repository of data for the computing device 600. As illustrated in FIG. 6, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 7:
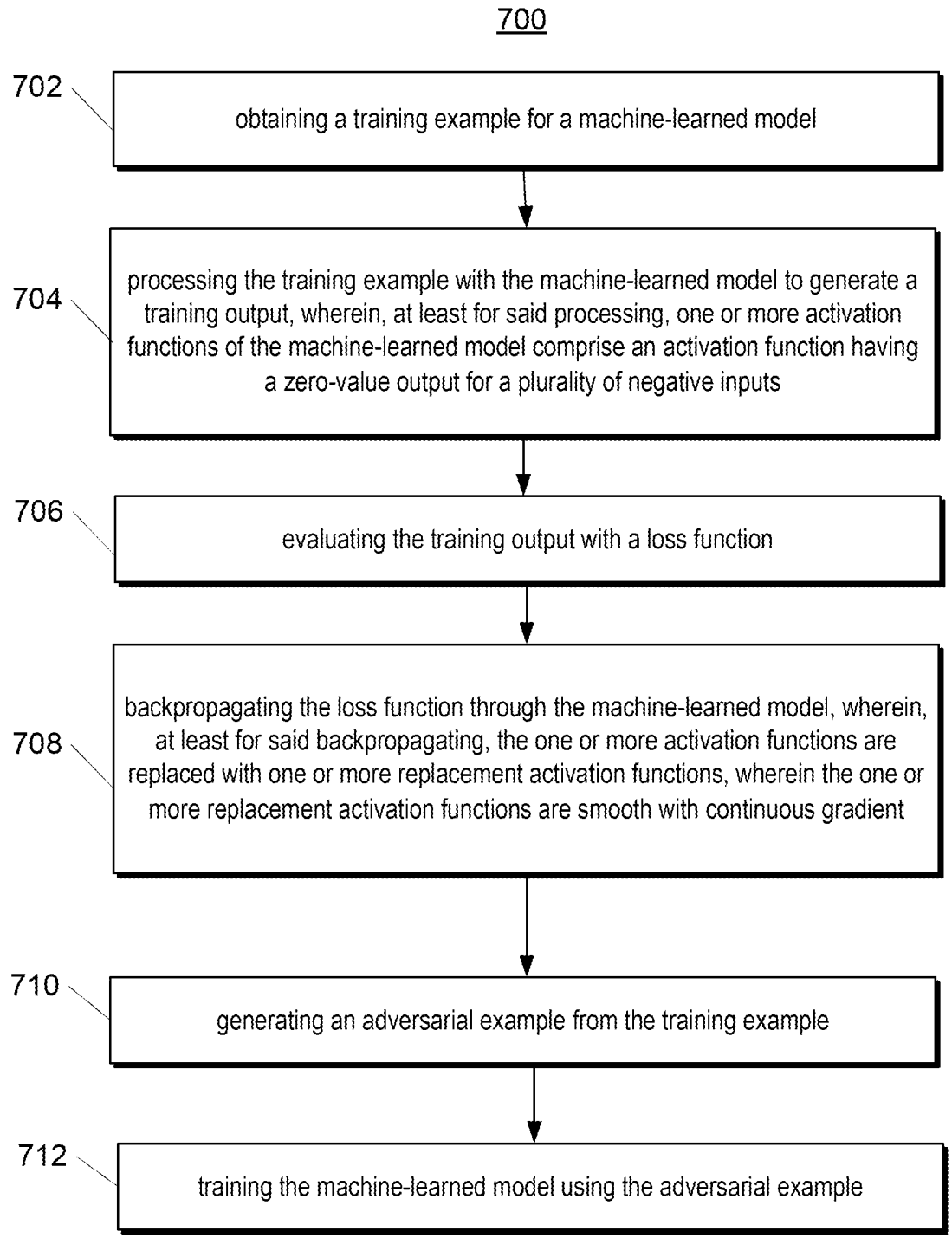
FIG. 7 depicts a flow chart diagram of an example method to train a neural network model according to example embodiments of the present disclosure.
Figure 8:
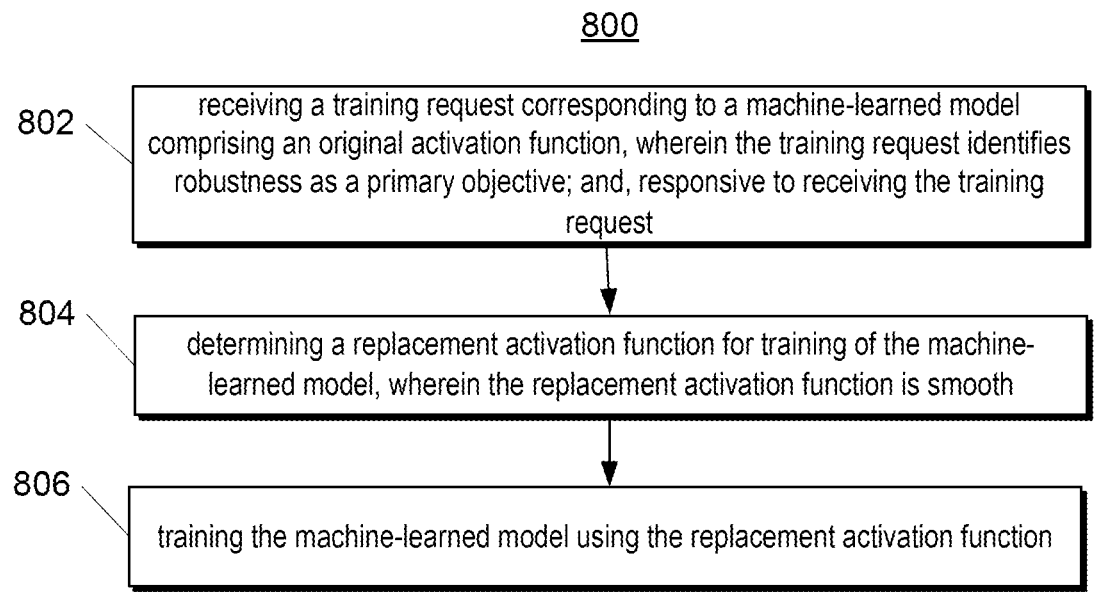
FIG. 8 depicts a flow chart diagram of another example method to train a neural network model according to example embodiments of the present disclosure.

FIGS. 7 and 8 depict flow chart diagrams of example methods to perform improved adversarial training to increase model robustness according to example embodiments of the present disclosure. Although FIGS. 7 and 8 depict steps performed in a particular order for purposes of illustration and discussion, the methods of the present disclosure are not limited to the particularly illustrated orders or arrangements. The various steps of the methods 700 and 800 can be omitted, rearranged, combined, and/or adapted in various ways without deviating from the scope of the present disclosure.

In example method 700, a computing system at 702 obtains a training example for a machine learned model.

At 704, the computing system processes the training example with the machine-learned model to generate a training output. At least for the processing of the training example, one or more activation functions of the machine-learned model comprise an activation function having a zero-valued activation output for a plurality of negative activation inputs.

At 706, the computing system evaluates the training output with a loss function.

At 708, the computing system backpropagates the loss function through the machine-learned model. At least for the backpropagation of the loss function, the one or more activation functions are replaced with one or more replacement activation functions. The replacement activation functions may be smooth (e.g., having a continuous gradient).

At 710, the computing system generates an adversarial example from the training example. In some embodiments, the adversarial example is generated at least in part based on the backpropagation of the loss function.

At 712, the computing system trains the machine-learned model using the adversarial example (e.g., as a training input or training example).

In example method 800, a computing system at 802 receives a training request. The training request may correspond to training a machine-learned model. The machine-learned model may comprise an original activation function (e.g., a smooth or non-smooth activation function). The training request may indicate or otherwise correspond to or identify robustness as a primary objective.

Responsive to receiving the training request, the computing system at 804 determines a replacement activation function for training of the machine-learned model. The replacement activation function may be a smooth activation function (e.g., as described herein).

At 806, the computing system trains the machine-learned model using the replacement activation function.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for improved adversarial training to increase model robustness, the method comprising:
   obtaining, by a computing system comprising one or more computing devices, a training example for a machine-learned model;
   executing, by the computing system, a first forward pass of the machine-learned model using a non-smooth activation function in at least one layer to generate a first output based on the training example;
   replacing, by the computing system and in the at least one layer for a first backward pass, the non-smooth activation function with a smooth replacement activation function for adversarial example generation;
   backpropagating, by the computing system and in the first backward pass, a loss function through the at least one layer having the smooth replacement activation function for adversarial example generation;
   perturbing, by the computing system and based on a gradient at the training example determined based on the backpropagating, the training example in a direction of the gradient corresponding to an increase in the loss function to obtain an adversarial example;
   executing, by the computing system, a second forward pass of the machine-learned model using the non-smooth activation function in the at least one layer to generate a second output based on the adversarial example;
   replacing, by the computing system and in the at least one layer for a second backward pass, the non-smooth activation function with the smooth replacement activation function for training the machine-learned model;
   backpropagating, by the computing system and in the second backward pass, the loss function through the at least one layer having the smooth replacement activation function for training the machine-learned model; and
   updating, by the computing system and based on a gradient at a model parameter determined based on the backpropagating, the model parameter in a direction of the gradient corresponding to a decrease in the loss function.

2. The computer-implemented method of claim 1, wherein, at least for said backpropagating, the smooth replacement activation function comprises a smooth approximation of a rectified linear unit.

3. The computer-implemented method of claim 2, wherein, at least for said backpropagating, the smooth replacement activation function of the machine-learned model comprises an activation function having a zero-value activation output for a plurality of negative activation inputs.

4. The computer-implemented method of claim 1, wherein the training output is generated based at least in part on a non-smooth activation function.

5. The computer-implemented method of claim 1, wherein the smooth replacement activation function comprises a learnable parameter, and wherein the method comprises:
   updating, by the computing system, the learnable parameter based on the backpropagating in the second backward pass.

6. The computer-implemented method of claim 1, wherein the machine-learned model comprises an image processing model, and wherein the training example is an image, and wherein perturbing, by the computing system and based on the gradient at the training example determined based on the backpropagating, the training example in the direction of the gradient corresponding to the increase in the loss function to obtain the adversarial example comprises:
modifying, by the computing system, the image.

7. The computer-implemented method of claim 1, wherein the one or more computing devices consist of a user computing device, wherein obtaining, by the one or more computing devices, the training example comprises obtaining, by the user computing device, a personal training example that is stored at a local memory of the user computing device, and wherein the machine-learned model is also stored at the local memory of the user computing device.

8. The computer-implemented method of claim 1, wherein the computing system comprises a user computing device, and wherein the training example is image is an image captured by the user computing device.

9. A computing system comprising:
one or more processors; and
one or more non-transitory computer-readable media that collectively store instructions that, when executed by the one or more processors, cause the computing system to perform operations, the operations comprising:
obtaining a training example for a machine-learned model;
executing a first forward pass of the machine-learned model using a non-smooth activation function in at least one layer to generate a first output based on the training example;
replacing, in the at least one layer for a first backward pass, the non-smooth activation function with a smooth replacement activation function for adversarial example generation;
backpropagating, in the first backward pass, a loss function through the at least one layer having the smooth replacement activation function for adversarial example generation;
perturbing, based on a gradient at the training example determined based on the backpropagating, the training example in a direction of the gradient corresponding to an increase in the loss function to obtain an adversarial example;
executing a second forward pass of the machine-learned model using the non-smooth activation function in the at least one layer to generate a second output based on the adversarial example;
replacing, in the at least one layer for a second backward pass, the non-smooth activation function with the smooth replacement activation function for training the machine-learned model;
backpropagating, in the second backward pass, the loss function through the at least one layer having the smooth replacement activation function for training the machine-learned model; and
updating, based on a gradient at a model parameter determined based on the backpropagating, the model parameter in a direction of the gradient corresponding to a decrease in the loss function.

10. The computing system of claim 9, wherein, at least for said backpropagating, the smooth replacement activation function comprises a smooth approximation of a rectified linear unit.

11. The computing system of claim 10, wherein, at least for said backpropagating, the smooth replacement activation function of the machine-learned model comprises an activation function having a zero-value activation output for a plurality of negative activation inputs.

12. The computing system of claim 9, wherein the training output is generated based at least in part on a non-smooth activation function.

13. The computing system of claim 9, wherein the smooth replacement activation function comprises a learnable parameter, and wherein the operations comprise:
updating the learnable parameter based on the backpropagating in the second backward pass.

14. The computing system of claim 9, wherein the computing system consists of a user computing device, wherein obtaining the training example comprises obtaining, by the user computing device, a personal training example that is stored at a local memory of the user computing device, and wherein the machine-learned model is also stored at the local memory of the user computing device.

15. One or more non-transitory computer-readable media that collectively store instructions that, when executed by one or more processors, cause a computing system to perform operations, the operations comprising:
obtaining a training example for a machine-learned model;
executing a first forward pass of the machine-learned model using a non-smooth activation function in at least one layer to generate a first output based on the training example;
replacing, in the at least one layer for a first backward pass, the non-smooth activation function with a smooth replacement activation function for adversarial example generation;
backpropagating, in the first backward pass, a loss function through the at least one layer having the smooth replacement activation function for adversarial example generation;
perturbing, based on a gradient at the training example determined based on the backpropagating, the training example in a direction of the gradient corresponding to an increase in the loss function to obtain an adversarial example;
executing a second forward pass of the machine-learned model using the non-smooth activation function in the at least one layer to generate a second output based on the adversarial example;
replacing, in the at least one layer for a second backward pass, the non-smooth activation function with the smooth replacement activation function for training the machine-learned model;
backpropagating, in the second backward pass, the loss function through the at least one layer having the smooth replacement activation function for training the machine-learned model; and
updating, based on a gradient at a model parameter determined based on the backpropagating, the model parameter in a direction of the gradient corresponding to a decrease in the loss function.

16. The one or more non-transitory computer-readable media of claim 15, wherein, at least for said backpropagating, the smooth replacement activation function comprises a smooth approximation of a rectified linear unit.

17. The one or more non-transitory computer-readable media of claim 16, wherein, at least for said backpropagating, the smooth replacement activation function of the machine-learned model comprises an activation function having a zero-value activation output for a plurality of negative activation inputs.

18. The one or more non-transitory computer-readable media of claim 15, wherein the training output is generated based at least in part on a non-smooth activation function.

19. The one or more non-transitory computer-readable media of claim 15, wherein the smooth replacement activation function comprises a learnable parameter, and wherein the operations comprise:

updating the learnable parameter based on the backpropagating in the second backward pass.

20. The one or more non-transitory computer-readable media of claim 15, wherein the computing system consists of a user computing device, wherein obtaining the training example comprises obtaining, by the user computing device, a personal training example that is stored at a local memory of the user computing device, and wherein the machine-learned model is also stored at the local memory of the user computing device.

\* \* \* \* \*